United States Patent

[11] 3,545,761

[72] Inventors Howard A. Brooks;
Thaddeus B. Curtz, Ann Arbor, Michigan
[21] Appl. No. 703,129
[22] Filed Feb. 5, 1968
[45] Patented Dec. 8, 1970
[73] Assignee KMS Industries, Inc.
Ann Arbor, Michigan
a corporation of Delaware

[54] COORDINATE WORD GAME APPARATUS
7 Claims, 6 Drawing Figs.

[52] U.S. Cl. .................................................. 273/130
[51] Int. Cl. .................................................. A63f 3/00
[50] Field of Search .......................................... 273/130,
135, 136(Cursory)

[56] References Cited
UNITED STATES PATENTS
1,988,301  1/1935  Coffin ............................ 273/136

| 2,053,598 | 9/1936 | Blau ........................... | 273/130 |
| 3,104,878 | 9/1963 | Roger ........................ | 273/130 |
| 3,149,842 | 9/1964 | Cirrincione ............... | 273/130 |
| 3,401,936 | 9/1968 | Greenberg ................. | 273/130X |

*Primary Examiner*—Delbert B. Lowe
*Attorney*—Barnes, Kisselle, Reisch and Choate ABSTRACT: A coordinate word game with a rectangular case with grids on a wall thereof having indicia of the ordinates and abscissae of the grids, a cover for the case with receptacles therein adapted to receive a plurality of plaques having grid segments with a letter superimposed thereon, the receptacles having indicia for the ordinates and abscissae of the plaques; and a plurality of markers for indicating points of intersection of the ordinates and abscissae of the grids.

PATENTED DEC 8 1970
3,545,761
SHEET 1 OF 2
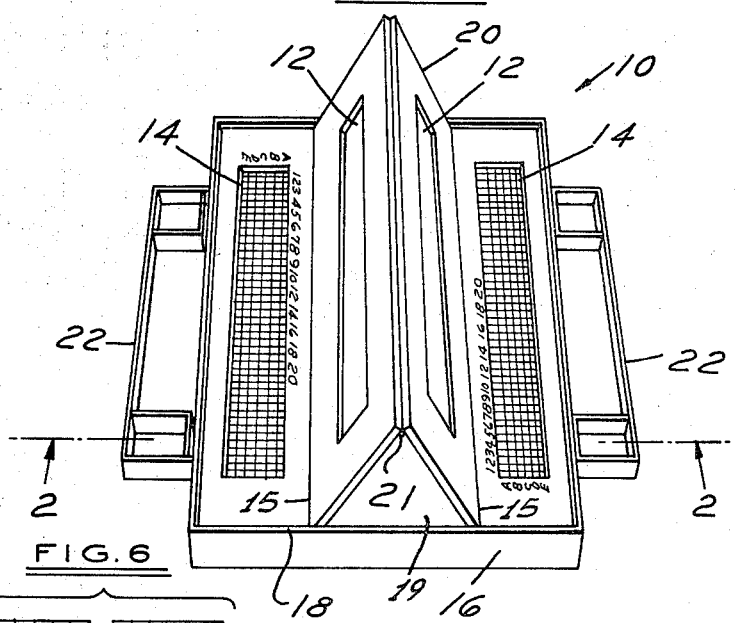
FIG. 1
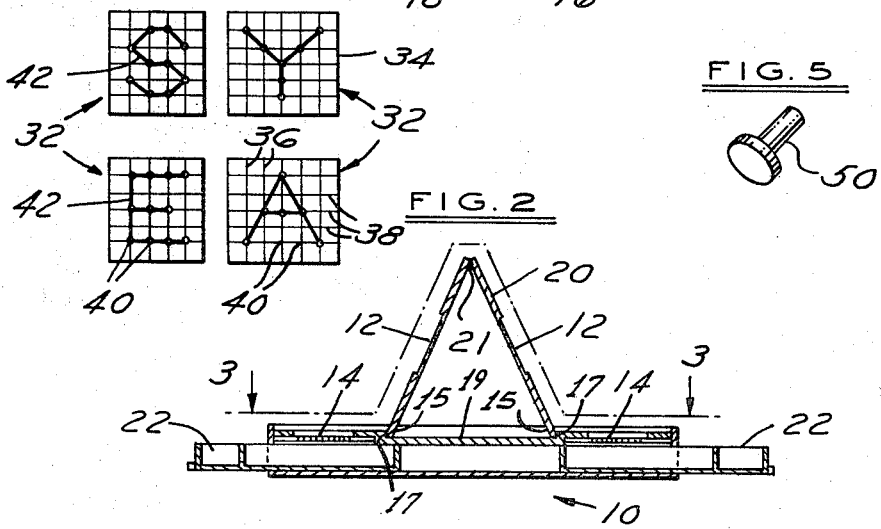
FIG. 6
FIG. 5
FIG. 2
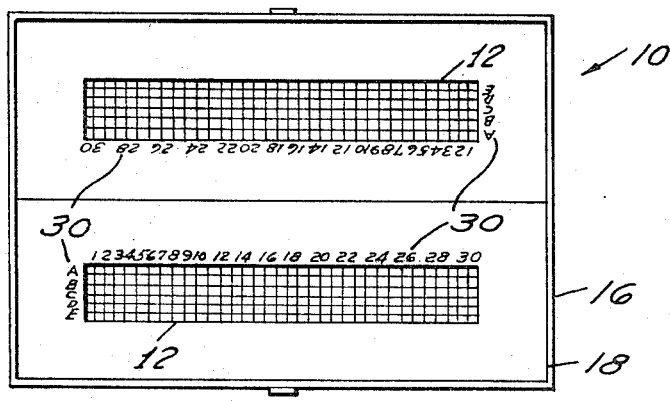
FIG. 4
INVENTORS
HOWARD A. BROOKS
THADDEUS B. CURTZ
BY
Barnes, Kisselle,
Raisch & Choate
ATTORNEYS

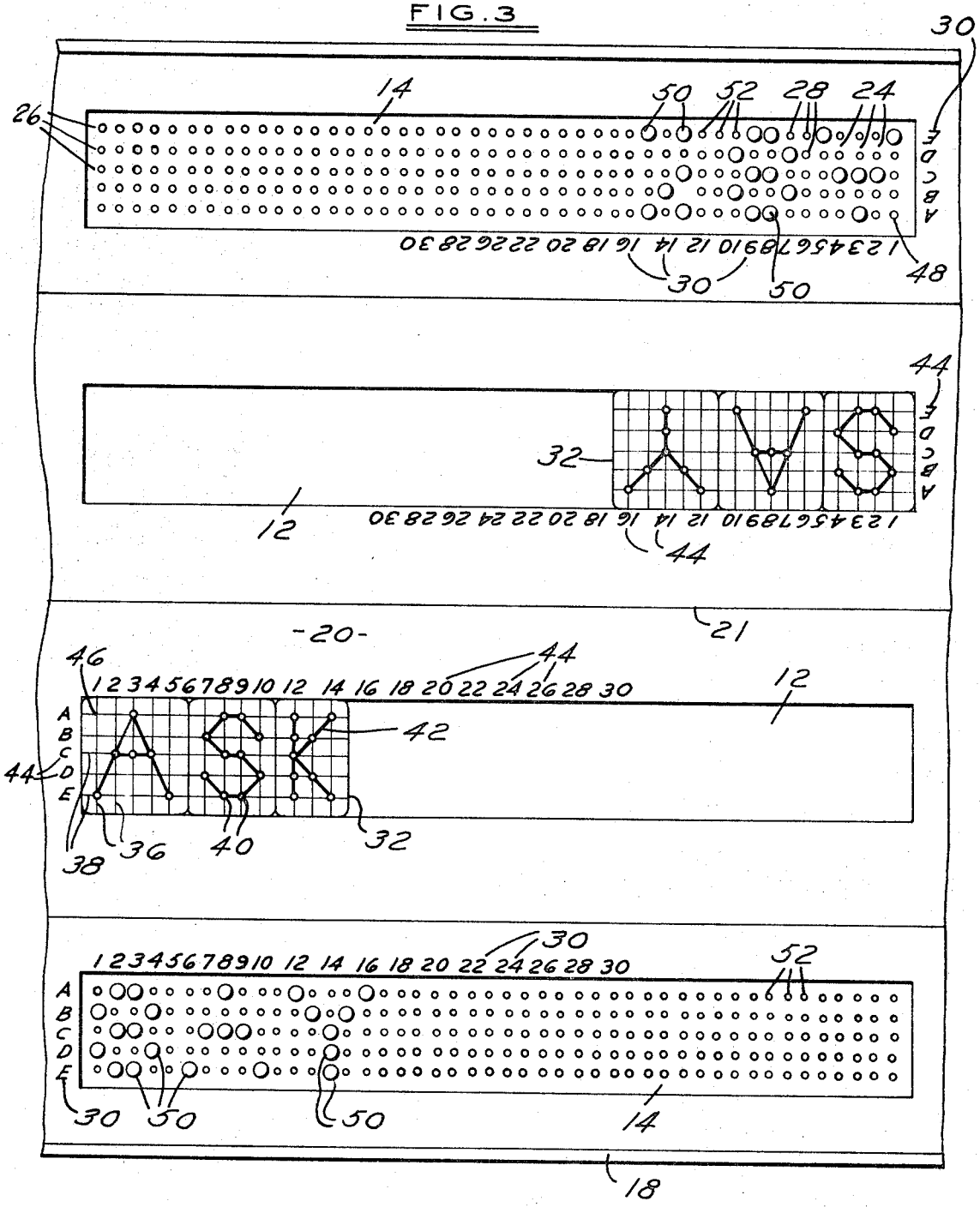

COORDINATE WORD GAME APPARATUS

BACKGROUND OF THE INVENTION

This invention relates to educational and amusement devices having coordinate point systems and more particularly to a coordinate word game.

In this invention each player attempts to determine a word composed by an opponent. Each letter used to compose a word is identified by a series or group of points on a grid segment of ordinates and abscissae each of which is identified by an indicia. A combination of one ordinate indicia and one abscissa indicia forms a set of coordinates which identifies the location of a particular point on the grid segment. By selecting sets of coordinates in turn, each player attempts to locate points which compose a portion of an opponent's word. Each player is provided with a grid on which to plot the points which compose a portion of an opponent's word and the first player to determine an opponent's word is the winner.

DESCRIPTION OF THE INVENTION

This invention relates to an educational and amusement apparatus and more particularly to a coordinate word game.

A principal object of this invention is to provide an amusing apparatus for instructing young children in the fundamentals of coordinate systems.

Another object of this invention is to provide persons with an opportunity to visualize objects described by a coordinate system.

Another object of this invention is to provide an amusing aid for teaching children to spell various words.

Other objects and features of this invention will be apparent from the following description and claims in which there is found the manner of making and using the invention and the best mode contemplated by the inventors for carrying out the invention.

Drawings accompany this disclosure and the various views thereof may be described as:

FIG. 1, a perspective view of the coordinate word game.
FIG. 2, a sectional view on line 2-2 of FIG. 1.
FIG. 3, an expanded view in the direction of line 3-3 of FIG. 2.
FIG. 4, a top view of the coordinate word game with a cover containing the receptacles in a closed position.
FIG. 5, a perspective view of a marking means.
FIG. 6, a top view of several plaques each having a grid segment with a letter superimposed thereon.

Referring to the drawings:

IN FIG. 1, a coordinate word game designated generally as 10 having receptacles 12 and grids 14 is shown. The grids 14 are in one wall of a rectangular cubicle 16 having a lip 18 extending beyond the wall containing the grids 14. The receptacles 12 are formed in a hinged cover 20 which folds into an inverted V-position with its lower edges 15 engaging upstanding walls 17 of a recess 19 in the upper wall of cubicle 16 as shown in FIGS. 1 and 2, and in a second position, as shown in FIG. 4, unfolds into a plane surface which is contained within the lip 18 and overlies the wall of the cubicle 16 containing the grids 14. A hinge 21 allows the two portions of the hinged cover 20 to fold. Drawers 22 are also provided in the rectangular cubicle 16.

As perhaps best shown in FIG. 3 each grid is comprised of a plurality of ordinates 24 and abscissae 26 which intersect at a plurality of points designated generally as 28. Indicia 30 are associated with each and every ordinate and abscissa so that each ordinate and each abscissa can be individually identified For example, as shown in the lower left-hand corner of FIG. 3, the Arabic numeral "1" identifies the first ordinate on the left-hand side of the grid and the indicia "A" of the English alphabet identifies the first abscissa at the top of the grid 14. The terms "ordinate" and "abscissa" in this disclosure are used as a convenient way of identifying the two components of the grid system. The use of the Arabic numerals and English letters as indicia of the ordinates and abscissae has been selected only as a matter of convenience and other indicia may by used to distinctly identify each component of the grid system.

In FIG. 6 a plurality of plaques, designated generally as 32, each having a grid segment 34 on at least one of its surfaces is shown, Each grid segment 34 has a plurality of ordinates 36 and a plurality of abscissa segments 38 which intersect at points designated generally as 40. A letter of the English alphabet 42 is superimposed on each grid segment and on some of the intersecting points 40 of the grid segment. In the preferred embodiment of this apparatus the points of intersection 40 which have a portion of the letter 42 superimposed thereon are emphasized by dots as shown in FIG. 6.

As shown in FIG. 3 each receptacle 12 has a plurality of indicia 44 and is designed so that it will position or facilitate alinement of a plurality of plaques 32 with each other. The receptacle indicia 44 are interrelated with the grid indicia 30 and they are also associated with the ordinates 36 and abscissa segments 38 of the plaques 32 so that any point of intersection 40 on the grid segment of a plaque 32 can be related to a corresponding point of intersection 28 on a grid 14. For example, as shown in FIG. 3, a particular point of intersection 46 on the grid segment of the plague with the letter "A" in the lower half of the FIG. has a corresponding point of intersection 48 on the grid 14 in the upper half of the FIG. The point 46 is identified by a combination of the receptacle indicia "1" associated with a particular ordinate 36 and the receptacle indicia "A" associated with a particular abscissa segment 38 and the point 46 corresponds to the similar point 48 on the grid identified by the combination of the interrelated grid indicia "1" associated with a particular grid ordinate 24 and the interrelated grid indicia "A" associated with a particular grid abscissa 26. The receptacles hold or align the plaques without necessarily totally enclosing or containing the plaques when they are placed in the receptacles.

A means of selectively marking the points of intersection 28 of each grid 14 is provided. In the preferred embodiment of this apparatus the selective marking means is a peg 50, shown in FIG. 5, which can be inserted in apertures 52 in the grid 14 at the points of intersection 28. In FIG. 3 several pegs 50 are shown inserted in apertures 52.

In playing this game each player is provided with a plurality of plaques 32 having superimposed thereon the various letters of an alphabet and a plurality of marking means 50 and is assigned a receptacle 12 and a grid 14. Each player composes a word by selecting plaques 32 and placing or aligning them in abutment to each other in his assigned receptacle 12. If there are two players of this game, the first player calls out a combination of one abscissa and one ordinate indicia and the second player responds by stating whether a combination is a "hit" or a "miss." A "hit" signifies that a combination identifies a point of intersection on a plaque grid segment placed in a receptacle having a portion of a letter superimposed on it and a "miss" signifies that a combination identifies a point of intersection on a plaque grid segment that does not have a portion of a letter on it. If the second player indicates that a combination is a "hit," the first player marks the point of intersection identified by the combination on the grid 14 assigned to him. The players take turns seriatim until a player determines the word that his opponent has composed. The first player to determine the word composed by this opponent is declared the winner. A player can attempt to identify the word composed by his opponent just prior to any one of this turns to call out a combination of indicia. If the player correctly identifies the word composed by his opponent, he is declared the winner; but if he fails to correctly identify the opponent's word, he loses his turn.

The above explanation of this game is framed in the context of two players; however, this game can be played by any number of players by providing each player with one less grid and receptacle than the total number of players. With three or more players each player calls out a combination of indicia and directs it toward a specific opponent. The players take turns seriatim and each player attempts to determine the words composed by all of his opponents. The winner is the player who is able to determine the greatest number of words during a period of time set by the players. If a player's word is identified prior to the expiration of this time period, he simply composes another word and continues to play.

We claim:

1. An educational and amusement apparatus which comprises:
   a. at least two grids each having a plurality of ordinates and abscissae which intersect at various points with an individual indicia for each ordinate and each abscissa;
   b. a plurality of plaques each having on at least one of its surfaces a grid segment with a plurality of ordinates and segments of abscissae which intersect at various points with a letter of the alphabet superimposed on some of the intersecting points of the grid segment;
   c. at least two plaque receptacles each having a plurality of individual indicia interrelated with the indicia of the grids and associated with the ordinates and abscissae formed by a plurality of plaques placed in each receptacle; and
   d. a plurality of means for selectively marking an intersection point of the grids, whereby when a plaque is placed in a receptacle the location of the various intersecting points with a portion of a letter superimposed thereon can be indicated on a grid by the use of the interrelated indicia and the selective marking means.

2. An educational and amusement apparatus as defined in claim 1 having only two grids and only two plaque receptacles.

3. An educational and amusement apparatus as defined in claim 2 which also comprises a cover having two portions and a rectangular cubicle, said grids being in substantially parallel spaced relationship in a wall of said rectangular cubicle, means providing a lip extending beyond said wall containing the grids and each receptacle being on one of said portions of said cover, said cover portions being hinged and supported relative to said cubicle so that they form an inverted V in one position and a plane surface within the boundaries of the lip in a second position.

4. An educational and amusement apparatus as defined in claim 3 which also comprises at least one drawer positioned within a portion of the cubicle.

5. An educational and amusement apparatus as defined in claim 1 in which each grid has an aperture at each point of intersection and in which the selective marking means is a peg which can be inserted in the aperture.

6. An educational and amusement apparatus as defined in claim 3 in which each grid has an aperture at each point of intersection and in which the selective marking means is a peg which can be inserted in the aperture.

7. An educational and amusement apparatus which comprises:
   a. a horizontal supporting panel having a pair of elongate, spaced shallow receptacles parallel to each other and positioned adjacent opposed edges of the panel, the bottom surface of each of the receptacles being provided with a plurality of ordinates and abscissae which intersect at various points with an individual indicia for each ordinate and each abscissa;
   b. a separate cover panel for the supporting panel hinged longitudinally to cover the supporting panel in a flat position and to support itself in a stable inverted V-position between the receptacles when raised, the cover panel having in each section on either side of the hinged joint an elongate receptacle for receiving and supporting a plurality of plaques bearing an identifiable indicia;
   c. a plurality of plaques having identifiable indicia thereon, said plaques being adapted to be supported in the receptacles of the cover, each having on at least one of its surfaces a grid segment with a plurality of ordinates and segments of abscissae which intersect at various points with the identifiable indicia on the plaque; and
   d. a plurality of means for selectively marking intersection points in the first-mentioned receptacles in the supporting panel.